(12) United States Patent
Grover et al.

(10) Patent No.: US 9,292,265 B2
(45) Date of Patent: Mar. 22, 2016

(54) METHOD FOR CONVERGENCE ANALYSIS BASED ON THREAD VARIANCE ANALYSIS

(75) Inventors: Vinod Grover, Mercer Island, WA (US); Yunsup Lee, Fremont, CA (US); Xiangyun Kong, Union City, CA (US); Gautam Chakrabarti, Sunnyvale, CA (US); Ronny M. Krashinsky, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 86 days.

(21) Appl. No.: 13/467,765

(22) Filed: May 9, 2012

(65) Prior Publication Data

US 2013/0305021 A1 Nov. 14, 2013

(51) Int. Cl.
*G06F 9/312* (2006.01)
*G06F 9/45* (2006.01)
*G06F 9/38* (2006.01)

(52) U.S. Cl.
CPC *G06F 8/41* (2013.01); *G06F 8/443* (2013.01); *G06F 8/45* (2013.01); *G06F 8/456* (2013.01); *G06F 9/3836* (2013.01); *G06F 9/3851* (2013.01); *G06F 9/3885* (2013.01)

(58) Field of Classification Search
None
See application file for complete search history.

(56) References Cited

U.S. PATENT DOCUMENTS

| 2004/0128660 A1 * | 7/2004 | Nair et al. | 717/156 |
| 2009/0259997 A1 * | 10/2009 | Grover et al. | 717/136 |
| 2011/0154300 A1 * | 6/2011 | Rao et al. | 717/133 |

* cited by examiner

*Primary Examiner* — Qing Wu
*Assistant Examiner* — Wynuel Aquino
(74) *Attorney, Agent, or Firm* — Artegis Law Group, LLP (57) ABSTRACT

Basic blocks within a thread program are characterized for convergence based on variance analysis or corresponding instructions. Each basic block is marked as divergent based on transitive control dependence on a block that is either divergent or comprising a variant branch condition. Convergent basic blocks that are defined by invariant instructions are advantageously identified as candidates for scalarization by a thread program compiler.

20 Claims, 7 Drawing Sheets

```
01    worklist ← Ř
02    for bb ∈ blocks(kernel) do
03        Conv(bb) ← True
04        for instr ∈ instructions(bb) do
05            Invariant(instr) ← True
06            if instr reads thread id then
07                worklist ← worklist ∪ instr
08            end if
09            if instr is an atomic instruction then
10                worklist ← worklist ∪ instr
11            end if
12        end for
13    end for
14    //
15    while worklist ≠ Ř do
16        instr ← POP (worklist)
17        Invariant(instr) ← False
18        for s ∈ DataFlowSucc(instr) do
19            if Invariant(s) == True then
20                worklist ← worklist ∪ s
21            end if
22        end for
23        if instr is a conditional branch instruction then
24            for bb ∈ IteratedControlDependenceSucc(instr) do
25                if Conv(bb) = True then
26                    Conv(bb) ← False
27                    for i ∈ instructions(bb) do
28                        worklist ← worklist ∪ i
29                    end for
30                end if
31            end for
32        end if
33    end while
```

METHOD FOR CONVERGENCE ANALYSIS BASED ON THREAD VARIANCE ANALYSIS

GOVERNMENT RIGHTS IN THIS INVENTION

This invention was made with U.S. government support under contract number No. HR0011-10-9-0008 awarded by DARPA. The U.S. government has certain rights in this invention.

BACKGROUND OF THE INVENTION

1. Field of the Invention

The invention relates generally to compiler systems and, more specifically, to a method for convergence analysis based on thread variance analysis.

2. Description of the Related Art

Certain computer systems include a parallel processing subsystem that may be configured to concurrently execute plural program threads that are instantiated from a common program. Such systems are referred to in the art as having single instruction multiple thread (SIMT) parallelism. CUDA is a programming model known in the art that implements SIMT execution on parallel processing subsystems. An application program written for CUDA may include sequential C language programming statements, and calls to a specialized application programming interface (API) used for configuring and managing parallel execution of program threads. A function within a CUDA application that is destined for concurrent execution on a parallel processing subsystem is referred to as a "thread program" of "kernel." An instance of a thread program is referred to as a thread, and a set of concurrently executing threads are organized as a thread block. A set of thread blocks may further be organized into a grid. Each thread is identified by an instance of an implicitly defined set of index variables configured to store thread identity information for the thread. Each thread may access their instance of the index variables and act independently with respect to other threads based on the thread identity information residing in the index variables.

One consequence of acting independently is that one set of threads may execute one branch of a conditional statement, while another set of threads executes a different branch of the same conditional statement. In such a scenario, the two different sets of threads execute divergent paths that need to converge at some point later during execution. Synchronization barrier operations in divergent portions of the thread program may lead to incorrect behavior, including deadlock. Conventional techniques for compiling thread programs are not able to detect divergent execution scenarios that may lead to incorrect execution behavior. Instead, conventional compilers depend on explicit source code directives and an assumption that a thread program design is correct by construction, an assumption that is sometimes not true. For example, a synchronization barrier may be executed in one branch of a conditional statement, but not in a different branch, preventing the synchronization barrier from ever unblocking and a related thread block from ever converging and completing. In scenarios where a divergence error such as this is present in the thread program design, the thread program may compile without error, but then function incorrectly at runtime.

In scenarios where a thread program design provides for correct operation, certain sections of the thread program may execute identically over an arbitrary number of threads. Such sections of the thread program are referred to as thread invariant, and produce identical results over an arbitrarily large thread block or number of thread blocks because each thread performs an identical sequence of computations on an identical set of inputs. Conventional compilers are not able to detect which sections of a thread program are thread invariant, and are therefore required to schedule all portions of the thread program to execute in parallel, leading to inefficient utilization of resources within the parallel processing subsystem.

As the foregoing illustrates, what is needed in the art is a technique for more efficiently managing execution divergence in thread programs.

SUMMARY OF THE INVENTION

One embodiment of the present invention sets forth a computer-implemented method for characterizing a thread program, the method comprising optimistically marking each basic block associated with the thread program as being convergent, optimistically marking a set of instructions associated with each basic block as being invariant, initializing a work list to include instructions that are known to be variant from the set of instructions, selecting an instruction from the work list, marking the selected instruction as variant, adding data-flow and control-dependent successor instructions to the work list based on the selected instruction, and propagating the variant and divergence attributes. The variant attribute is propagated to instructions and divergence attribute is propagated to basic-blocks.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that a thread program compiler is able to automatically detect thread invariant basic blocks within a thread program and implement scalarization optimizations when compiling the thread program.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
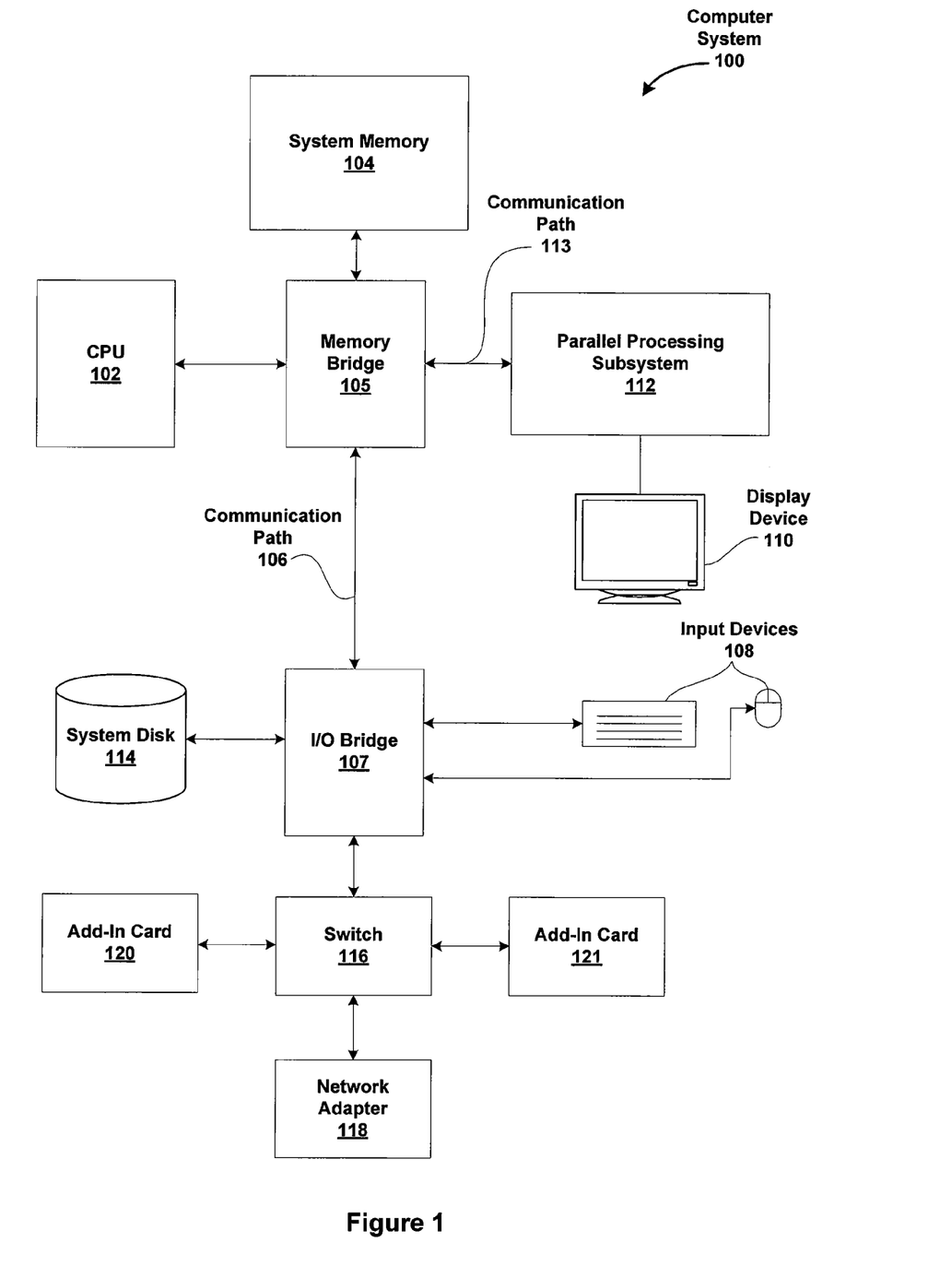
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 configured to communicate via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Certain embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In one embodiment, a thread program is compiled for execution by parallel processing subsystem 112 by a thread program compiler. The thread program compiler translates a source representation of the thread program into a compiled representation of the thread program. For example, the source representation may comprise original source code, such as source code written by a developer, and the compiled representation may comprise an intermediate code easily translated for execution by parallel processing subsystem 112. The compiled representation may also comprise an executable thread program suitable for direct execution by parallel processing subsystem 112. The thread program compiler may be implemented within a driver module for the parallel processing subsystem that compiles the executable thread program, or as an application level module that generates either the intermediate code or executable thread program.

In addition to generating the compiled representation of the thread program, the thread program compiler also performs convergence analysis and divergence management, described below in greater detail. Convergence analysis allows the thread program compiler to statically determine when threads within a thread block are known to be non-divergent. Such analysis is significant for both program correctness and performance. In particular, the thread program compiler can use uniform (or "scalar") operations for thread-invariant values when threads are known to be convergent. Uniform operations may include uniform loads, scalar register accesses, and scalar instructions. Convergence analysis may enable scalarization to factor out uniform work from single instruction multiple thread (SIMT) threads. The uniform work may then be advantageously assigned to shared scalar resources to improve utilization efficiency of resources within parallel processing subsystem 112. Persons skilled in the art will recognize that convergence analysis techniques described herein are broadly applicable to many different multi-threaded system architectures, including any processor system that provides or models multi-threaded execution in combination with scalar resources.

One goal of embodiments of the present invention is to find program points in a thread program where all threads of a thread block could be converged. In this setting, a program point is considered convergent if and only if a thread-block barrier placed at the program point will never fail. A barrier will never fail if either all threads in the thread block will arrive at the barrier or if none of the threads in the thread block will arrive at the barrier. One way of interpreting thread convergence is that all or none of the threads within the thread block will be collected at the barrier, which represents a convergence point. In one embodiment, different types of barriers may be placed according to thread organization. For example in the CUDA (tm) runtime from NVIDA (tm), a_syncthreads( ) call would be used to as a barrier to synchronize across a cooperative thread array (CTA), whereas a syncwarp construct would be used to synchronize across a warp. A first step in analyzing thread program convergence is to represent execution flow within the thread program as a control flow graph and a control dependence graph, illustrated in FIGS. 2A-2B, below.

Figure 2A:
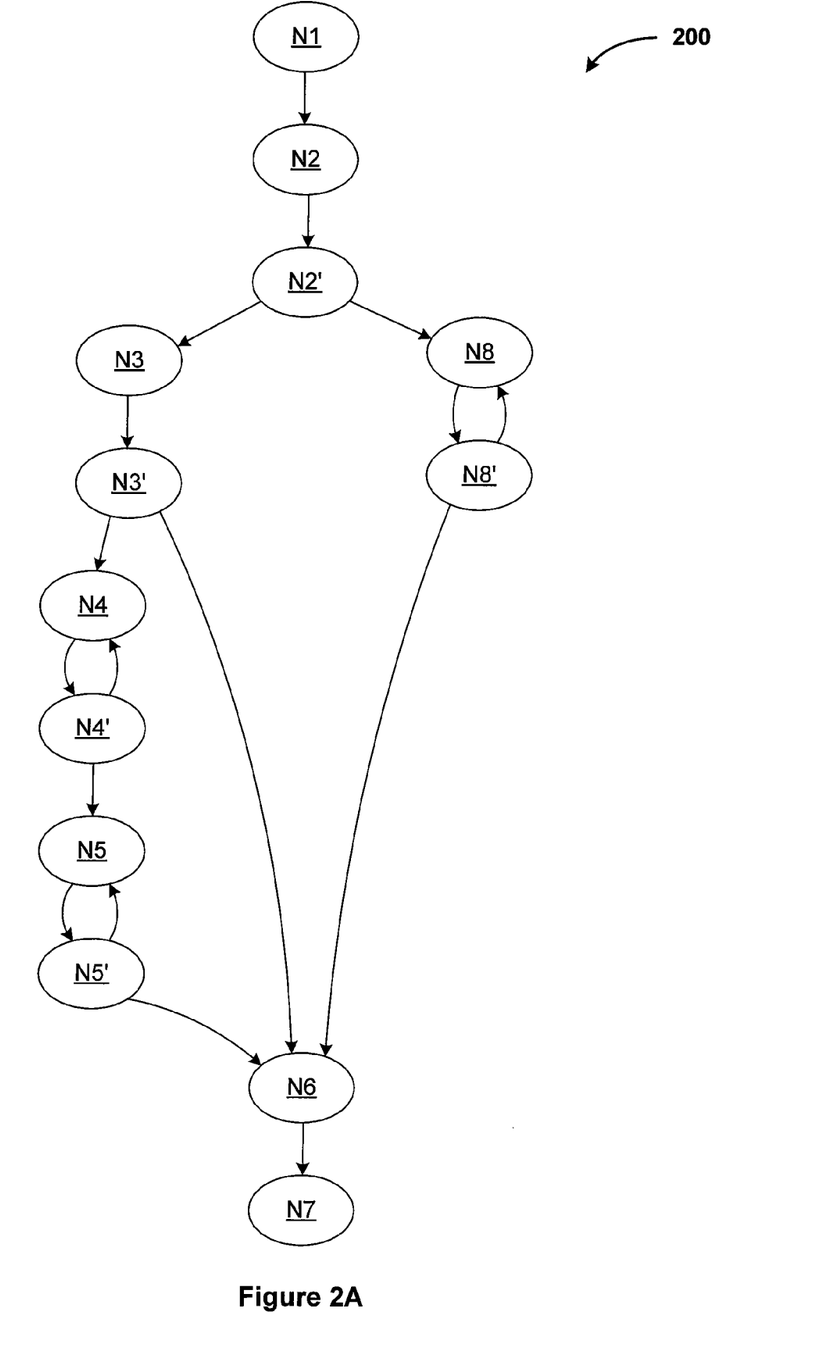
FIG. 2A illustrates an exemplary control flow graph for a thread program, according to one embodiment of the present invention.

FIG. 2A illustrates an exemplary control flow graph (CFG) 200 for a thread program, according to one embodiment of the present invention. CFG 200 illustrates each possible execution path within a thread program. CFG 200 is organized as a set of basic blocks (BBs), which are populated with instructions comprising the thread program. As shown, CFG 200 includes BBs N1 through N7. Each BB starts with a label instruction, and is terminated by a control transfer instruction. A control transfer instruction can specify an unconditional branch to a label of a basic block, or a conditional control transfer instruction with three operands: condition, label true, and label false. When the condition is true then execution branches to label true, otherwise execution branches to label false. For a given thread program, a CFG may be constructed using BBs to represent each available execution path, where each BB has one or two successors. For example in CFG 200, N1 has one successor, while N2' has two successors.

Figure 2B:
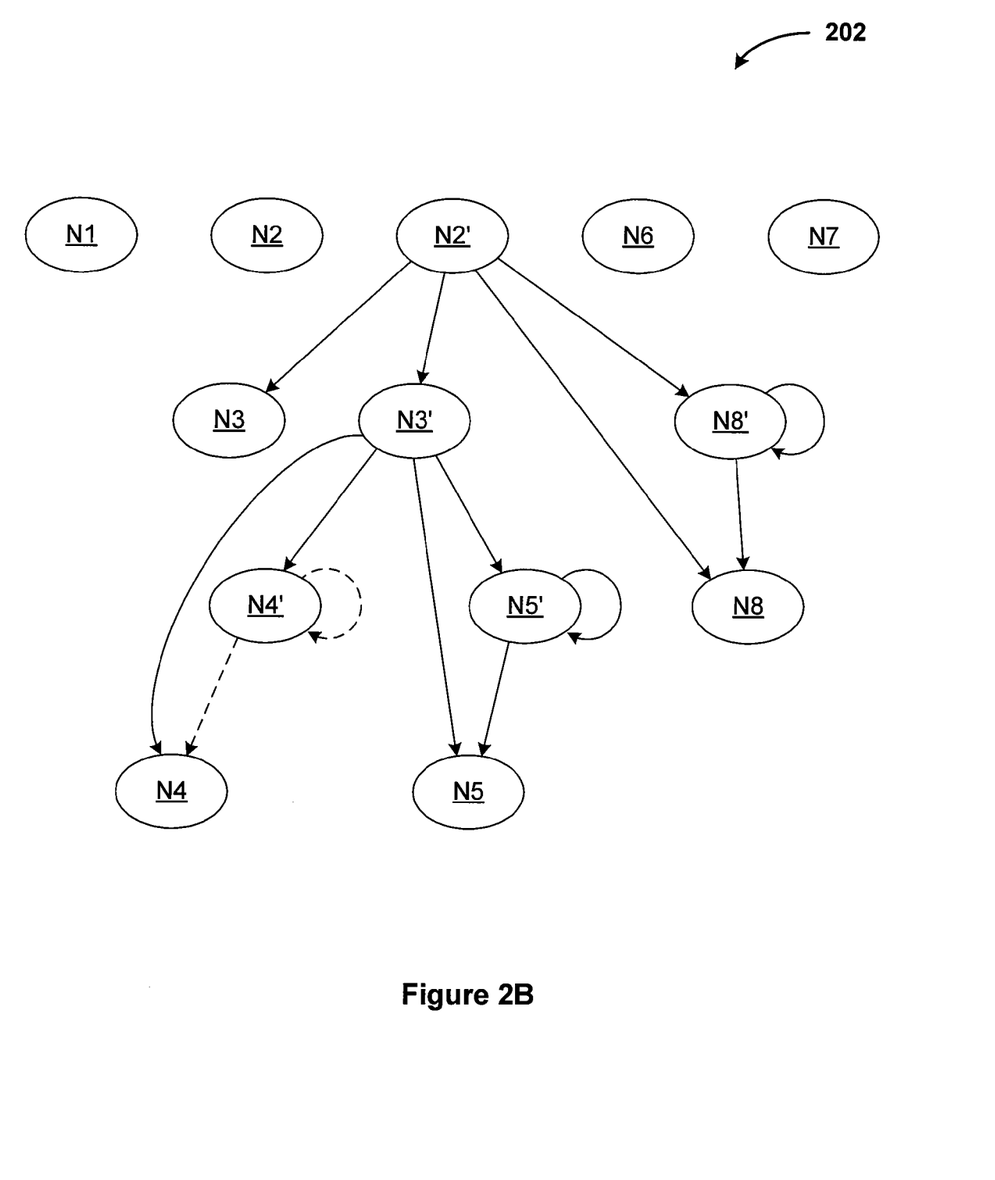
FIG. 2B illustrates an exemplary control dependence graph for the thread program, according to one embodiment of the present invention.

FIG. 2B illustrates an exemplary control dependence graph (CDG) 202 for the thread program, according to one embodiment of the present invention. As shown CDG 202 comprises BBs corresponding to N1 through N7 from CFG 200. Control dependence is defined as follows. If X and Y are BB nodes in a CFG, Y is control dependent on X (written X<Y) if and only if (1) there exists a directed path P from X to Y with any Z in P (excluding X and Y) post-dominated by Y, and (2) X is not post-dominated by Y. As is well known, a node Z is post-dominated by node Y if all exit paths within the graph from node Z must go through node Y.

An instruction is thread invariant if and only if the value produced by the instruction is independent of which thread is executing the instruction. An instruction is thread variant if the instruction is not thread invariant. Thread variance may originate from access to a thread identifier variable or from atomic instructions that may result in different results for different threads executing an atomic instruction, or access to a volatile memory, or any statement that reads from an external channel. Different thread languages may have their own particular cases of thread variant instructions. In this example, the conditional terminating BB N4' is assumed thread variant and corresponding control dependencies are shown as dashed lines.

As described in formula 1, below, a basic block is convergent if and only if it is transitively control dependent on convergent blocks with an associated branch condition that is thread invariant, written T inv(block), with an assumption that every block is always convergent:

$$\forall b \ b<x:\text{convergent}(b) \land \text{Tinv}(b) \Rightarrow \text{convergent}(x) \quad (1)$$

Alternatively, a basic block is divergent if it is transitively control dependent on a divergent block or is transitively control dependent on a block with a variant branch condition, written T variant(block). This is described below in formula 2:

$$\exists b \ b<x:\text{divergent}(b) \lor \text{Tvariant}(b) \Rightarrow \text{divergent}(x) \quad (2)$$

Embodiments of the present invention exploit the characterization of divergence expressed in formula 2 after initially assuming, optimistically, that all blocks are convergent. This approach fits well with optimistic variance analysis for performing a combined variance and convergence analysis.

Figure 2C:
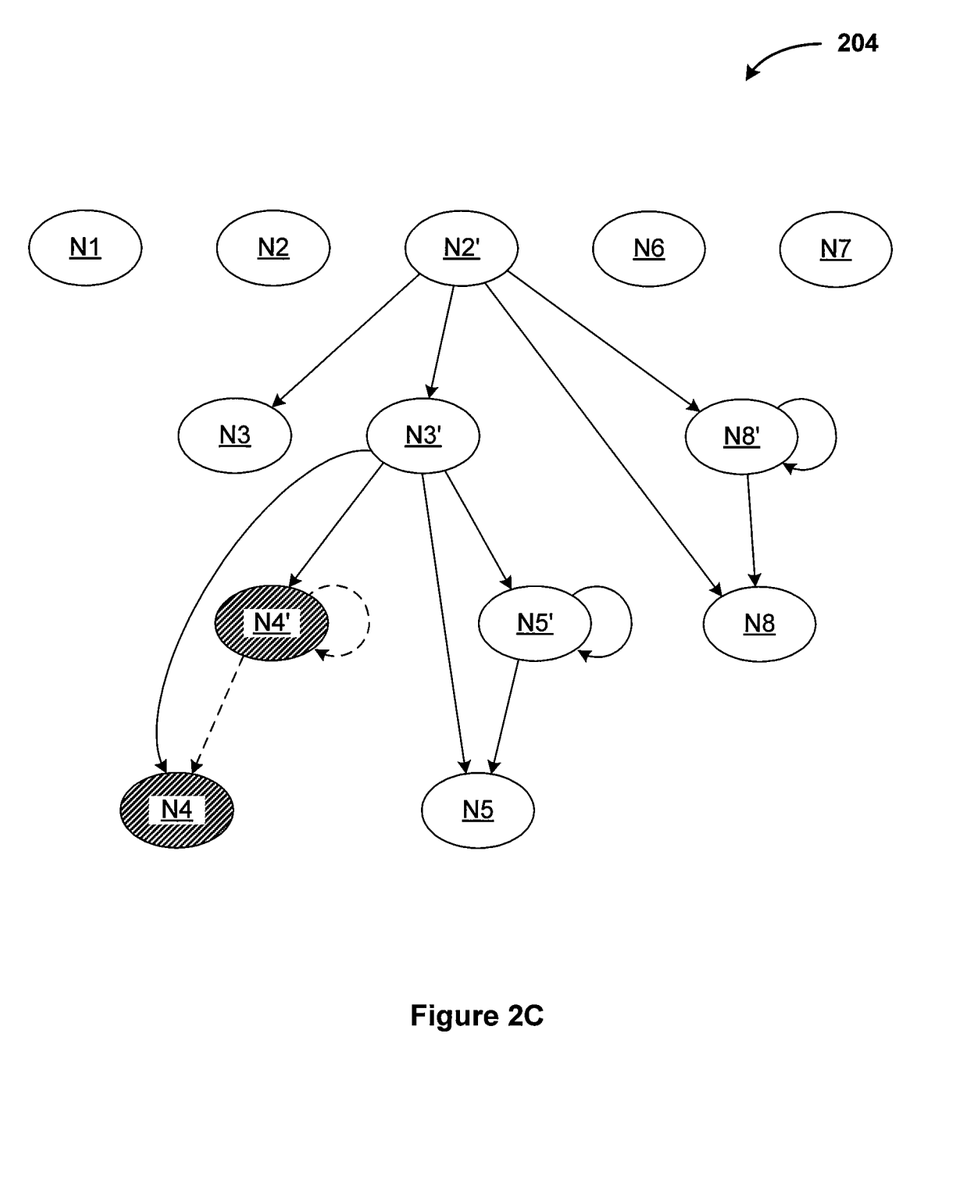
FIG. 2C illustrates the control dependence graph with propagated divergence information for the thread program, according to one embodiment of the present invention.

FIG. 2C illustrates CDG 204 with propagated divergence information for the thread program, according to one embodiment of the present invention. CDG 204 is derived from CDG 202 and annotated to reflect divergence information. Again, BB N4' is thread variant, indicated by dashed lines. Divergent nodes are determined by propagating variant control dependencies, and marked with a hash pattern. In this example, BBs N4 and N4' are divergent. However BB N5 is convergent because BB N5 is control independent of N4' in CDG 202, which means all divergent threads must pass through N5 and may hence be collected by an appropriate barrier.

Figure 2D:
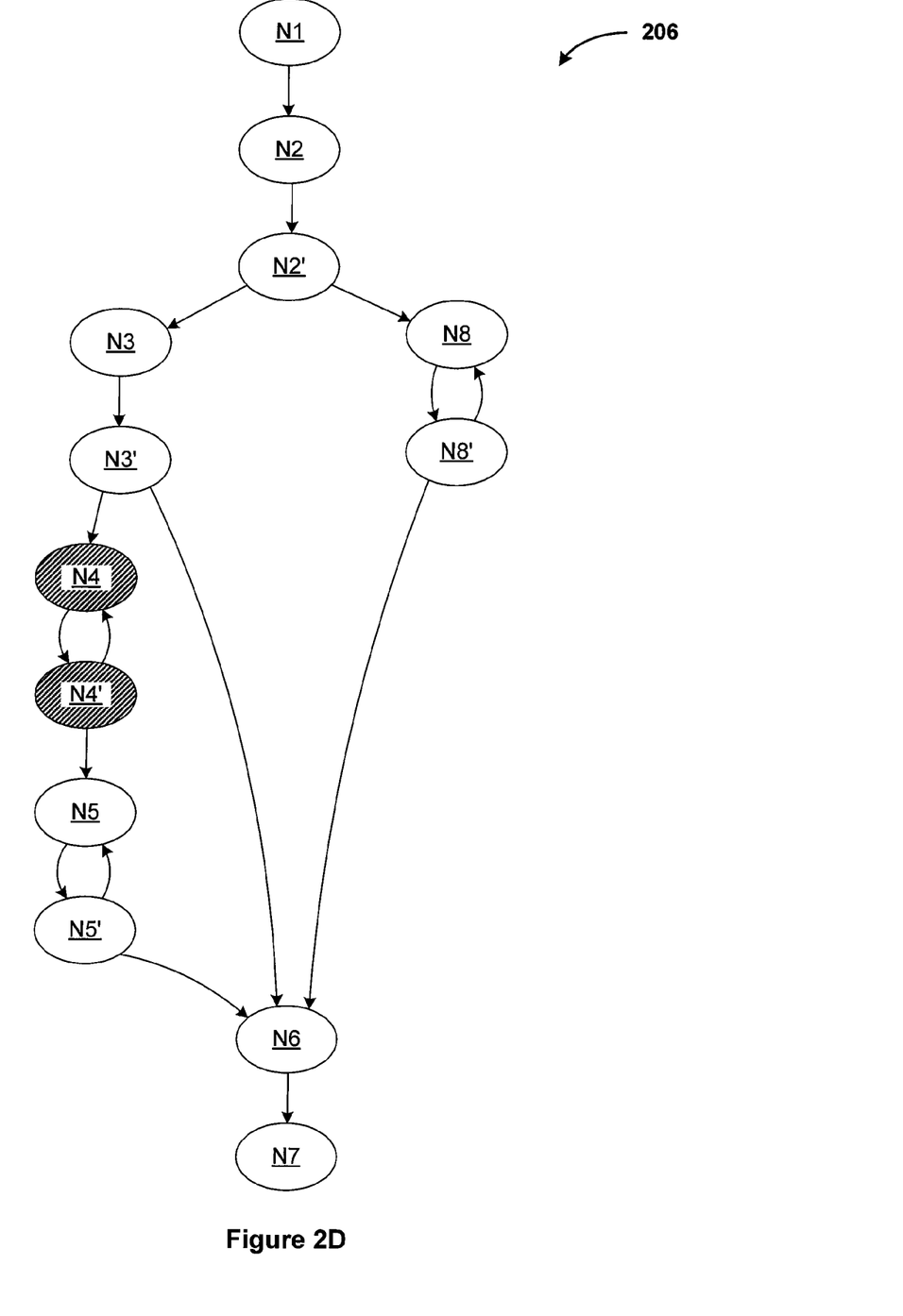
FIG. 2D illustrates the control flow graph for the thread program with propagated divergence information for the thread program, according to one embodiment of the present invention.

FIG. 2D illustrates CFG 206 for the thread program with propagated divergence information for the thread program, according to one embodiment of the present invention. As shown, only BBs N4 and N4' are divergent, as determined in CDG 204 of FIG. 2, while the remaining BBs are convergent.

Figure 3:
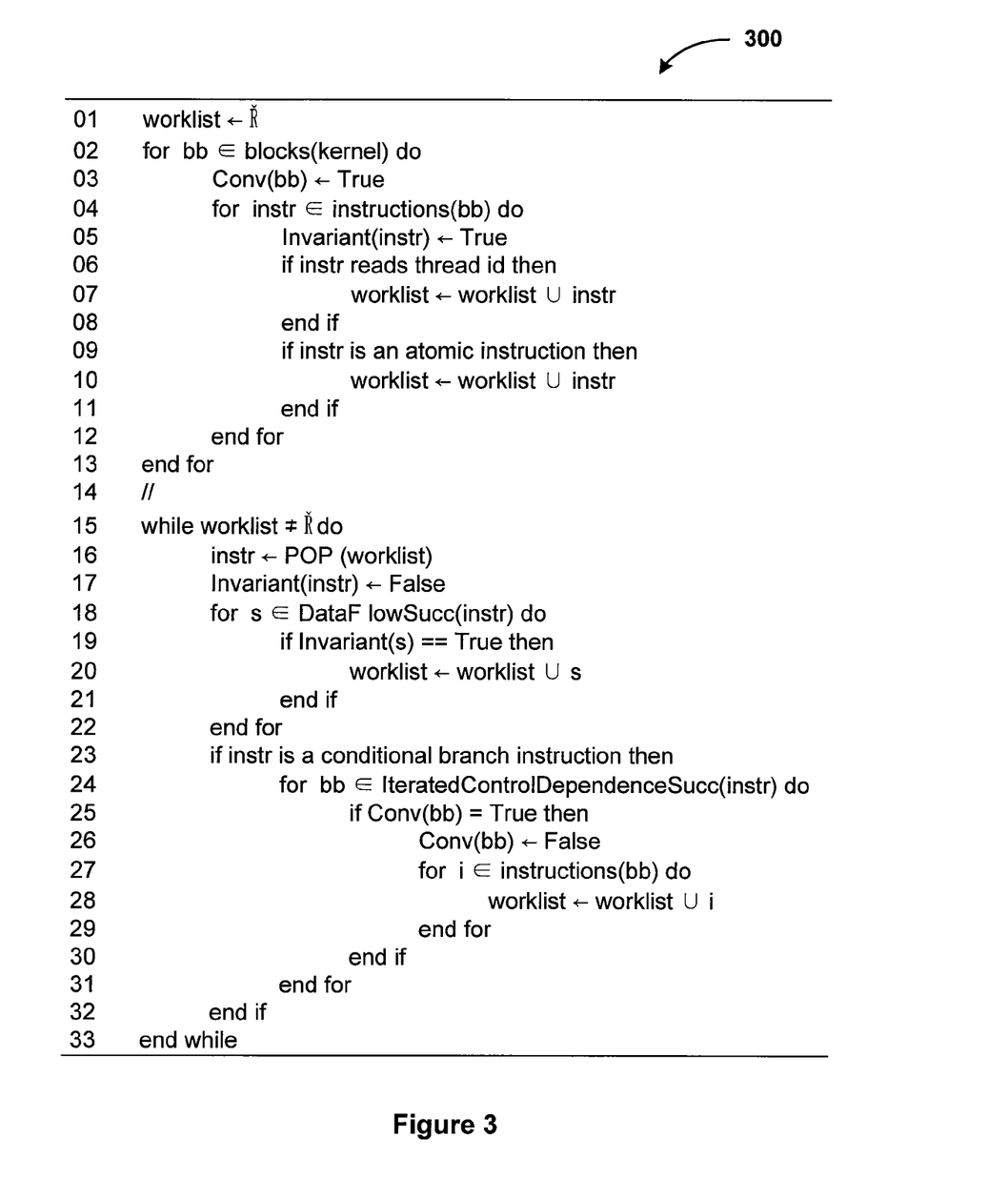
FIG. 3 sets forth a pseudo-code implementation for computing variance and divergence information, according to one embodiment of the present invention.

FIG. 3 sets forth a pseudo-code implementation 300 for computing variance and divergence information, according to one embodiment of the present invention. Implementation 300 assumes that a thread program to be analyzed has been parsed into a set of BBs for the thread program (kernel). Furthermore, each BB includes a set of corresponding instructions. A given BB is indicated as "bb" in the pseudo-code. A given instruction is indicated as "instr" in the pseudo-code. A control data graph and a control flow graph of the thread program are also generated. Any technically feasible technique may be implemented to parse the thread program and to generate corresponding graphs without departing the scope and spirit of embodiments of the present invention.

In line 1, a work list is initialized to empty. A first for-loop spanning line 2 through line 13 visits each bb associated with the set of BBs. In line 3, each bb is optimistically marked as converged. A second for-loop spans lines 4 through 12. The second for-loop visits each instruction within a current bb. In line 5, each instruction is optimistically marked as invariant. If, in line 6, the instruction reads a thread identifier, then the instruction is added to the work list. In one embodiment, only unique instances of the instruction are added to the work list. For example, if on instance of the instruction is already present within the work list, then adding the instruction does not add a second instance of the instruction to the work list. Reading a thread identifier may potentially lead to variant execution, so the instruction is added to the work list for further evaluation. If, in line 9, the instruction performs an atomic instruction, then the instruction is added to the work list. Performing an atomic instruction may result in variant execution, so the instruction is added to the work list for further evaluation.

A while-loop spanning lines 15 to 33 visits each instruction within the work list until the work list is empty. In line 16 an instruction is popped from the work list and marked as variant (not invariant) in line 17. A third for-loop spans lines 18 through 22. The third for-loop visits each data-flow successor instruction to the popped instruction, as given by the control flow graph. If, in line 19, a visited successor instruction is invariant, then the successor instruction is added to the work list. If, in line 23 the popped instruction is a conditional branch instruction then a fourth for-loop, spanning lines 25 through 31 is executed. The fourth for-loop visits each bb associated with each control dependence successor to the popped instruction. If a visited bb is marked as converged, then the bb is marked as false instead. Furthermore, if the visited bb is marked as true, then a fifth for-loop spanning lines 27 through 29 is executed to add each instruction associated with the bb to the work list.

The while-loop continues to execute and visit entries within the work list until the work list is empty. Upon completion of the while loop, each BB within the thread program is marked as being convergent or divergent and each instruction may be marked as being variant or invariant.

Figure 4:
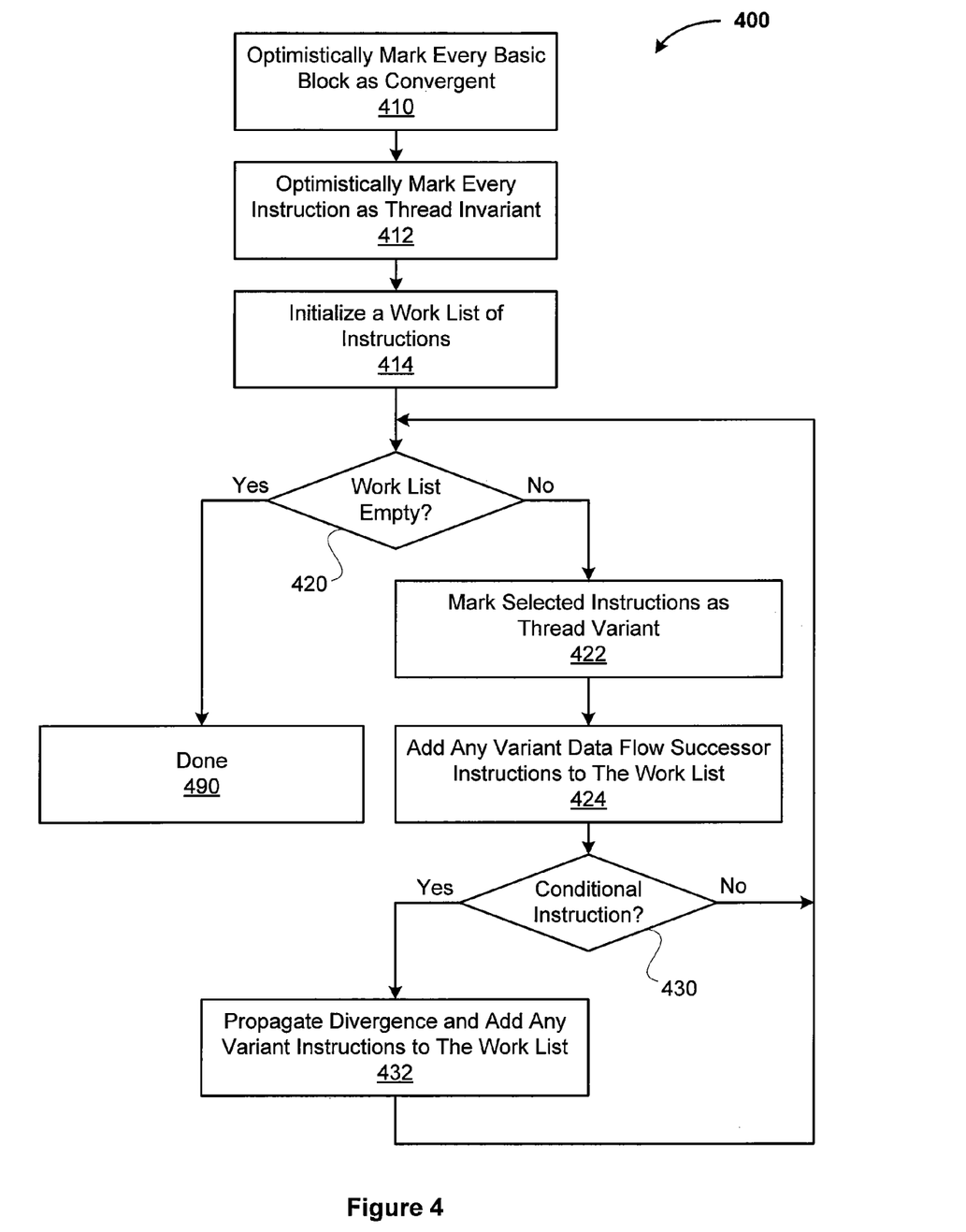
FIG. 4 sets forth a flowchart of method steps for computing variance and divergence information, according to one embodiment of the present invention.

FIG. 4 sets forth a flowchart of method 400 for computing variance and divergence information, according to one embodiment of the present invention. Although the method steps are describe in conjunction with the systems of FIGS. 1-2, persons skilled in the art will understand that any system configured to perform the method steps, in any order, is within the scope of the present invention.

Method 400 assumes that a thread program to be analyzed has been parsed into a set of BBs for the thread program (kernel). A control data graph and a control flow graph of the thread program are also generated. Any technically feasible technique may be implemented to parse the thread program and to generate corresponding graphs without departing the scope and spirit of embodiments of the present invention.

The method begins in step 410, where every BB is marked as convergent. In step 412, every instruction is marked as thread invariant. In step 414, a work list of instructions is initialized to include known variant instructions. In one embodiment, the work list is initialized to include, without limitation, those instructions that read thread identification information or perform atomics actions. Persons skilled in the art will recognize that steps 410 through 414 are implemented in pseudo-code lines 1 through 13 of FIG. 3.

If, in step 420, the work list is not empty, then the method proceeds to step 422, where an instruction is selected and marked as variant. Step 422 is implemented in pseudo-code lines 16 and 17. In step 424, successor instructions to the selected instruction are added to the work list. This step is implemented in pseudo-code lines 18 through 22.

If, in step 430, the selected instruction is a conditional instruction, then the method proceeds to step 432, where divergence is propagated to each BB having a control dependence on the selected instruction. Steps 430 and 432 are implemented in pseudo-code lines 23 through 32. Having completed step 432, the method proceeds back to step 420.

Returning to step 420, if the work list is empty, then the method terminates in step 490.

Returning to step 430, if the selected instruction is not a conditional instruction, then the method proceeds to step 420.

Method 400 characterizes each BB within a thread program as being either convergent or divergent and each instruction within the BB as being either variant or invariant. With this characterization information available, the thread program compiler is able to automatically identify scalarization opportunities within a thread program, as well as identify areas that may be functionally problematic due to thread divergence.

In one embodiment, the thread program compiler implements method 400 to identify a BB that is convergent and comprised of invariant instructions. The identified BB is a candidate for scalarization. The thread program compiler then generates scalarized instructions for the BB for scalar execution as part of an overall task of compiling an associated thread program. Scalar execution may be scheduled on a dedicated scalar execution unit within parallel processing subsystem 112, a thread unit within parallel processing subsystem 112, a central processing unit, or any other technically feasible processing unit. In one embodiment, certain divergent BBs comprising a barrier operation may be reported by the thread compiler as being a potential source of erroneous function. In certain embodiments, a system on a chip (SoC) implements a CPU and a parallel (SIMD or SIMT) co-processor architecture. In such embodiments, scalarized basic blocks from the thread program are compiled to execute on the CPU, while other basic blocks are configured to execute on the parallel co-processor. Such an architecture may advantageously utilize different processing resources more efficiently by assigning scalar tasks to the CPU and parallel tasks to the parallel co-processor.

In sum, a technique for characterizing each basic block within a thread program as being either convergent or divergent is disclosed. The technique involves generating a work list of instructions known to be variant from instructions associated with each basic block. Instructions from the work list are then sequentially assessed. An instruction from the work list is selected and marked as variant, along with successor instructions to the selected instruction. If the instruction is a conditional branch, then each associated basic block is marked as divergent. Each instruction associated with a divergent basic block is added to the work list. The work list may shrink and grow during execution, but once the work list is empty, each basic block is marked as being either convergent or divergent. Convergent basic blocks comprised of invariant instructions are candidates for scalarization.

One advantage of the disclosed technique is that a thread program compiler is able to automatically detect thread invariant basic blocks within a thread program and implement scalarization optimizations when compiling the thread program. A second advantage of the disclosed technique is that the thread compiler is able to detect potential design errors within the thread program and report the potential design errors to a developer for more efficient development.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A computer-implemented method for characterizing a thread program, the method comprising:

marking each basic block associated with the thread program as being convergent, wherein each basic block includes a plurality of instructions and starts with a label instruction and is terminated by a control transfer instruction;

marking a set of instructions associated with each basic block as being invariant;

initializing a work list that includes instructions that are known to be variant relative to the set of instructions;

selecting a first instruction from the work list;

marking the first instruction as variant;

adding successor instructions to the work list based on the first instruction; and propagating a divergence attribute to identify associated basic blocks as divergent, and to identify instructions within the associated basic blocks as variant.

2. The method of claim 1, wherein initializing comprises:
visiting each basic block associated with the thread program;
for each basic block, visiting each instruction associated with the basic block;
determining that the instruction is variant; and
adding the instruction to the work list.

3. The method of claim 2, wherein an instruction that is variant accesses a thread identification register.

4. The method of claim 2, wherein an instruction that is variant performs an atomic operation.

5. The method of claim 1, wherein propagating comprises:
determining that the first instruction is a conditional branch instruction;
marking as divergent a set of basic blocks having a control dependence on the selected instruction; and
adding each instruction associated with the set of basic blocks to the work list.

6. The method of claim 1, wherein selecting an instruction comprises popping the instruction from the work list.

7. The method of claim 1, wherein adding an instruction comprises pushing a unique instance of the instruction onto the work list.

8. The method of claim 1, further comprising determining that a first basic block is a candidate for scalarization based on the first basic block being convergent.

9. The method of claim 8, further comprising generating scalarized code for the first basic block for scalar execution.

10. A non-transitory computer-readable storage medium including instructions that, when executed by a processing unit, cause the processing unit to characterize a thread program, by performing the steps of:
marking each basic block associated with the thread program as being convergent, wherein each basic block includes a plurality of instructions and starts with a label instruction and is terminated by a control transfer instruction;
marking a set of instructions associated with each basic block as being invariant;
initializing a work list that includes instructions that are known to be variant relative to the set of instructions;
selecting a first instruction from the work list;
marking the first instruction as variant;
adding successor instructions to the work list based on the first instruction; and
propagating a divergence attribute to identify associated basic blocks as divergent, and to identify instructions within the associated basic blocks as variant.

11. The non-transitory computer-readable storage medium of claim 10, wherein initializing comprises:
visiting each basic block associated with the thread program;
for each basic block, visiting each instruction associated with the basic block;
determining that the instruction is variant; and
adding the instruction to the work list.

12. The non-transitory computer-readable storage medium of claim 11, wherein an instruction that is variant accesses a thread identification register.

13. The non-transitory computer-readable storage medium of claim 11, wherein an instruction that is variant performs an atomic operation.

14. The non-transitory computer-readable storage medium of claim 10, wherein propagating comprises:
determining that the first instruction is a conditional branch instruction;
marking as divergent a set of basic blocks having a control dependence on the selected instruction; and
adding each instruction associated with the set of basic blocks to the work list.

15. The non-transitory computer-readable storage medium of claim 10, wherein selecting an instruction comprises popping the instruction from the work list.

16. The non-transitory computer-readable storage medium of claim 10, wherein adding an instruction comprises pushing a unique instance of the instruction onto the work list.

17. The non-transitory computer-readable storage medium of claim 10, further comprising determining that a first basic block is a candidate for scalarization based on the first basic block being convergent and including only invariant instructions.

18. The non-transitory computer-readable storage medium of claim 17, further comprising scheduling the first basic block for scalar execution.

19. A computing device, comprising:
a mass storage system configured to store at least a thread program;
a processing unit coupled to the mass storage system and configured to:
mark each basic block associated with the thread program as being convergent, wherein each basic block includes a plurality of instructions and starts with a label instruction and is terminated by a control transfer instruction;
mark a set of instructions associated with each basic block as being invariant;
initialize a work list that includes instructions that are known to be variant relative to the set of instructions;
select a first instruction from the work list;
mark the first instruction as variant;
add successor instructions to the work list based on the first instruction; and
propagate a divergence attribute to identify associated basic blocks as divergent, and to identify instructions within the associated basic blocks as variant.

20. The computing device of claim 19, wherein the processing unit is further configured to:
determine that a first basic block is a candidate for scalarization based on the first basic block being convergent and including only invariant instructions; and
schedule the first basic block for scalar execution within a thread program executable.

* * * * *